March 27, 1951 D. E. LEWIS 2,546,461
COMBINATION AGRICULTURAL IMPLEMENT
Filed Aug. 30, 1945 3 Sheets-Sheet 2
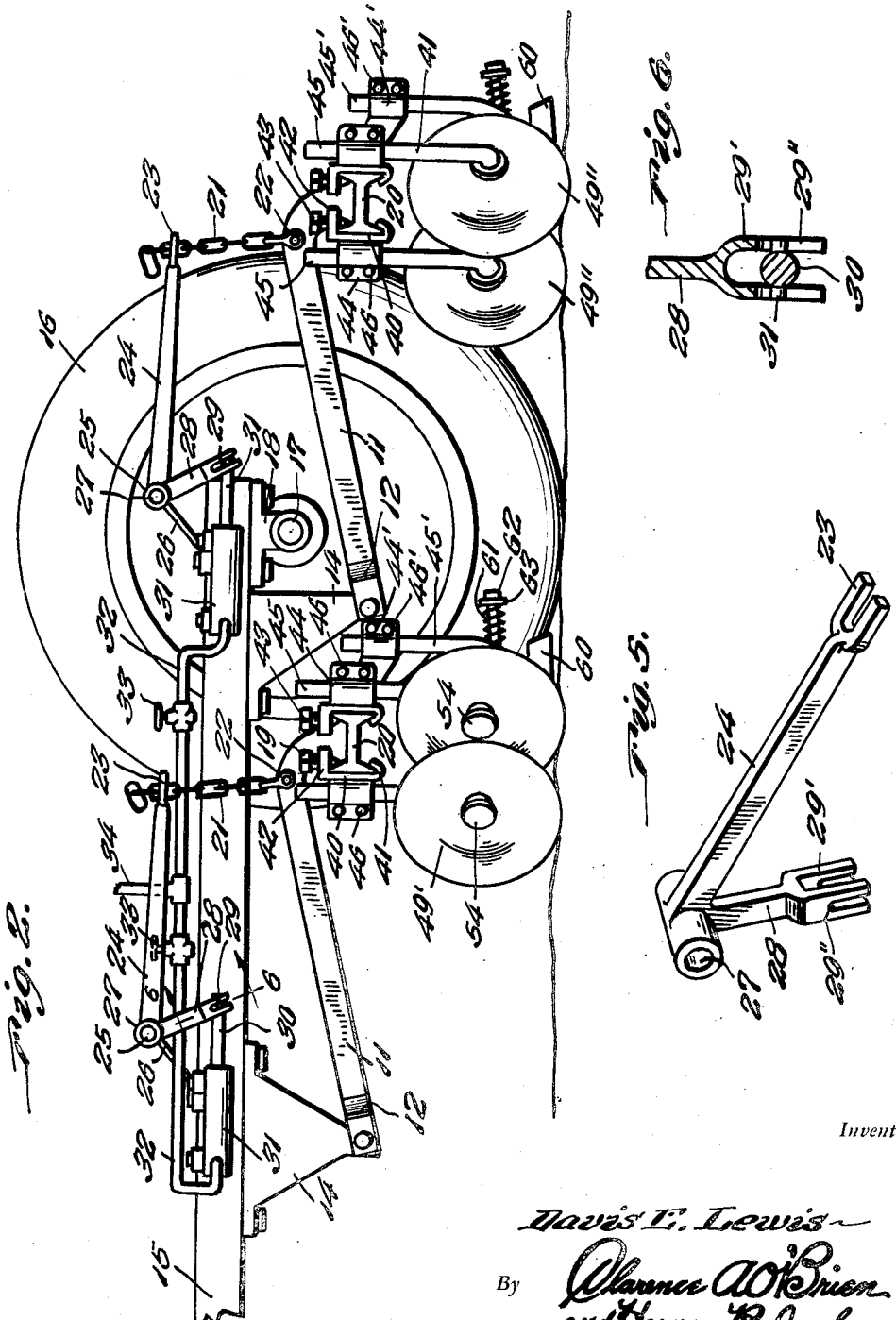
Inventor
Davis E. Lewis
By Clarence A. O'Brien
and Harvey B. Jacobson
Attorneys

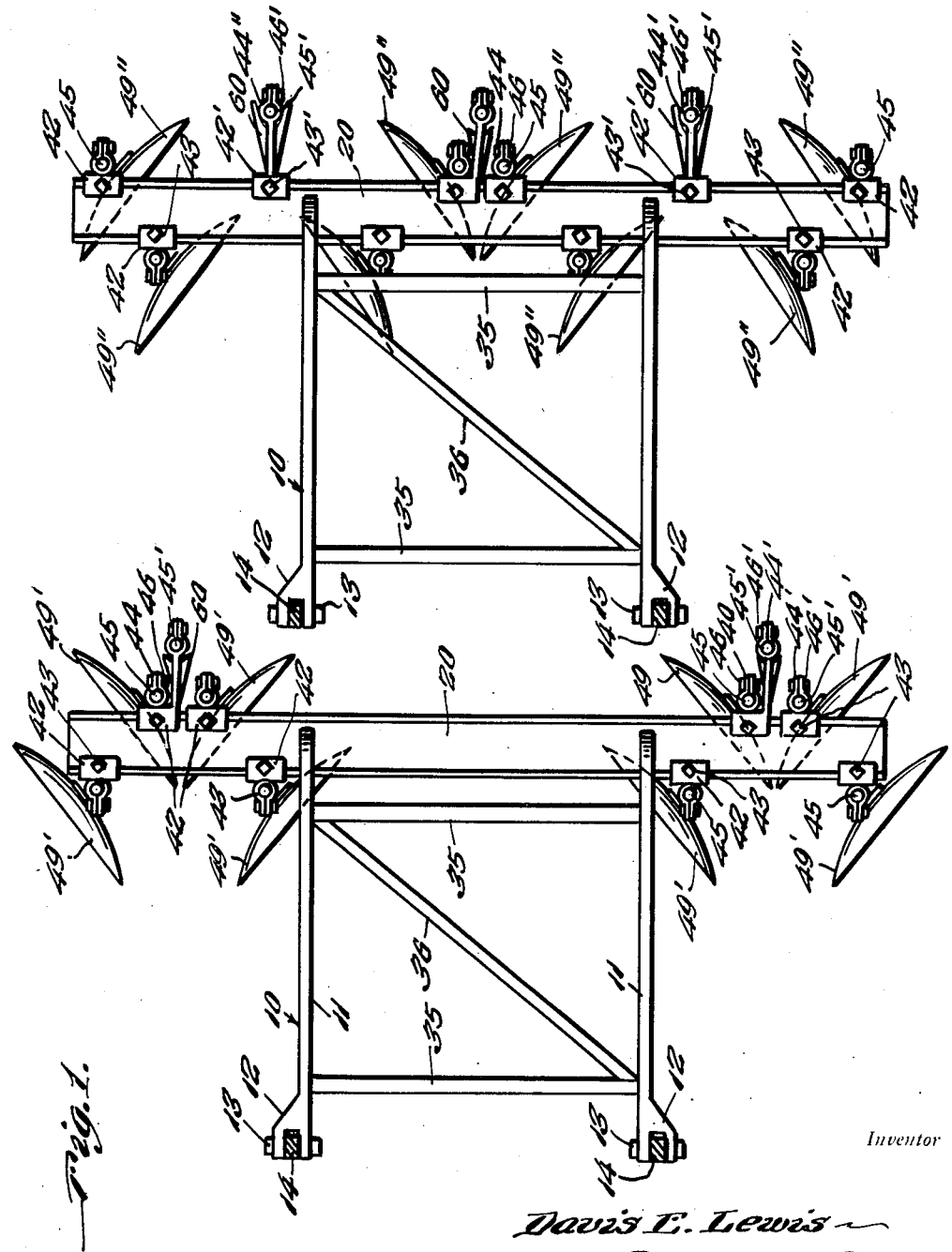

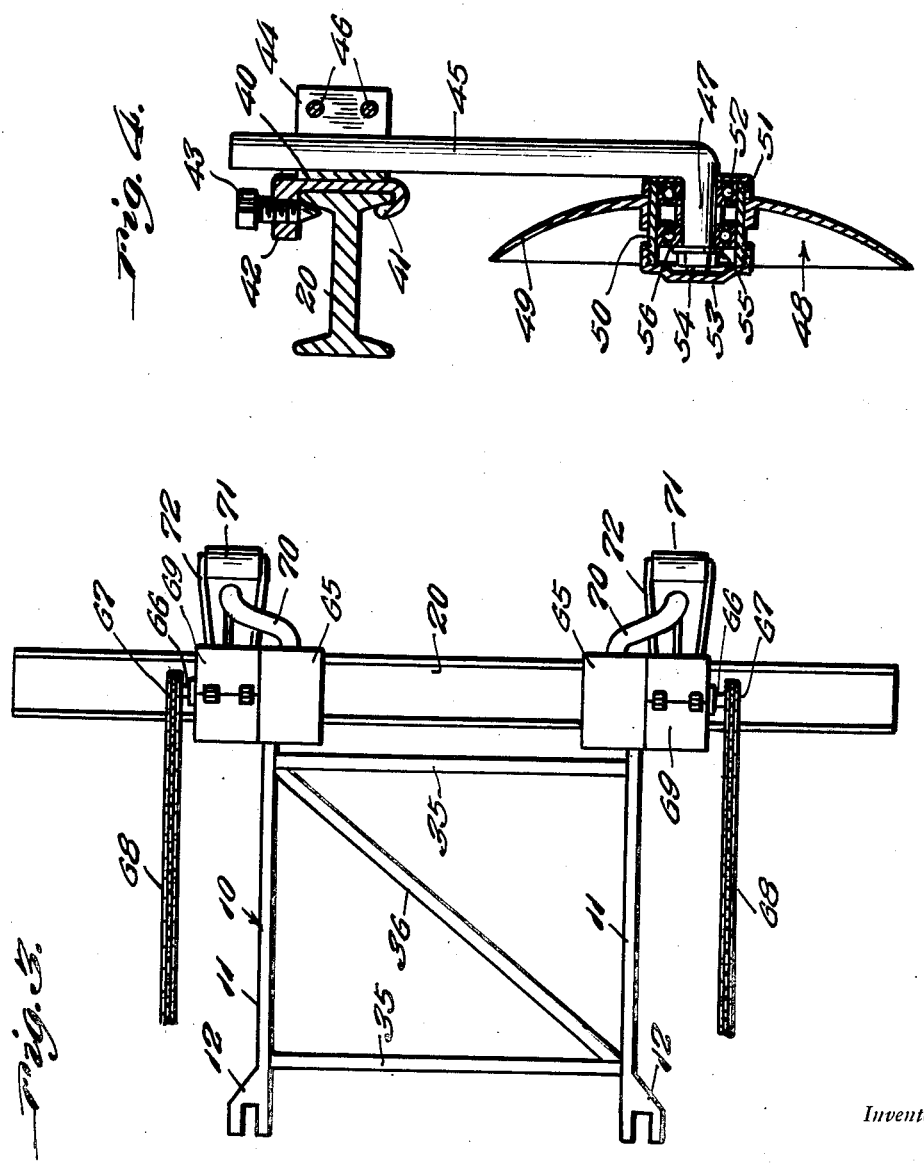

Patented Mar. 27, 1951

2,546,461

UNITED STATES PATENT OFFICE 2,546,461

COMBINATION AGRICULTURAL IMPLEMENT

Davis E. Lewis, Arcola, La.

Application August 30, 1945, Serial No. 613,587

2 Claims. (Cl. 97—47)

This invention relates to a combination agricultural implement, and more particularly to such an implement adapted to perform a variety of functions useful in agriculture, and adapted to be towed by a tractor or similar power-driven vehicle.

A primary object of this invention is the provision of a combination agricultural implement characterized by a frame adapted to be secured to a tractor, and liftable by a hydraulic lift associated with the tractor, the frame having a transverse member secured thereto, and a plurality of removable and replaceable agricultural implements associated with the transverse member.

An additional object of the invention is the provision of such a device characterized by the provision of a relatively large number of movable harrow disks adapted to be mounted on the transverse member, and adapted to be so positioned as to perform a plurality of functions in harrowing.

An additional object of the invention is the provision of such a device provided with means whereby additional agricultural implements may be mounted upon or removed from the device at the will of the farmer.

A still further object of the invention is the provision of an agricultural device characterized by two sections, a front and a rear section, each section having a plurality of farm implements secured thereto, the arrangement being such that the front section may be adjusted, for example, to tear down a bed, while the rear section is adjusted to weed, bed and plant.

An additional object of the invention is the provision of such a device as set forth in the foregoing object characterized by means whereby a planter and fertilizer unit may be positioned on one of the sections in such manner that seed is dropped at the desired points, disks are provided to cover the seed, and fertilizer is adapted to be spread before the seed has been planted.

Still another object is the provision of such a device provided with means whereby cultivating teeth may be readily positioned on the frame to supplement or supplant a desired disk or disks.

Still another object of the invention is the provision of such a device which will be sturdy and durable in construction, reliable and efficient in operation, and relatively simple and inexpensive to manufacture, assemble, and operate.

Other objects reside in the combinations of elements, arrangements of parts, and features of construction, all as will be more fully pointed out hereinafter and disclosed in the accompanying drawings wherein there is shown a preferred embodiment of this inventive concept.

In the drawings—

Figure 1 is a top view partially in section and partially in plan showing the front and rear sections of the device as adapted to be associated with a tractor and towed thereby, Figure 2 is a side elevational view of the structure shown in Figure 1, certain portions thereof being broken away, and certain related portions of a tractor being disclosed, Figure 3 is a view similar to a portion of Figure 1, but showing different types of agricultural implements in place on the device, Figure 4 is an enlarged sectional view taken substantially through the center line of any one of the harrow disks, Figure 5 is an enlarged perspective view of a constructional detail, and Figure 6 is an enlarged sectional view taken substantially along the line 6—6 of Figure 2, as viewed in the direction indicated by the arrows.

Similar reference characters refer to similar parts throughout the several views of the drawings.

Having reference now to the drawings, there is generally indicated at 10 front and rear supporting frames which are substantially identical in construction. Each frame is comprised of a pair of spaced, longitudinally extending bars or rods 11 terminating in brackets 12, adapted to be secured, as by means of pins 13, to depending lugs 14 secured at suitably spaced points to the tractor frame, generally indicated at 15. The rear wheel of the tractor is shown at 16 and includes an axle 17, which is supported, as by a bracket 18, the rear end of the frame 15.

As best shown in Figure 2, each of the members 11 is formed with a downwardly extending portion 19 terminating in an I-beam 20, which extends transversely with respect to the longitudinal members 11. A chain 21 is secured in any desired manner, as by a pin 22 to each of the arms 11 at the bend thereof. The chain is secured at its upper extremity in suitable bifurcations 23 at the extremity of a bell crank member 24 which is in turn pivotally secured on a pivot 25 carried by a suitable extending member 26 on the frame 15. The bell crank member 24 includes, as best shown in Figure 5, a transversely extending sleeve 27 adapted to surround the pivot pin 25. Each bell crank member 24 includes an angularly disposed leg 28 terminating in a doubly bifurcated portion 29, that is to say, bifurcated in two planes at right angles to each other. The pairs of bifurcations are generally indicated at 29' and 29''. As best shown in Figure 6, the bifurcations 29' are adapted to pass on opposite sides of a horizontal rod 30, while the bifurcations 29'' are adapted to extend on opposite sides of a transverse pin 31 extending through the shaft 30.

Each of the shafts 30 comprises the movable portion of a hydraulic element including a cylinder 31 within which is positioned a conventional hydraulic piston (not shown) secured to the end of the rod 30. Suitable feed lines 32 enter the cylinders 31, valves 33 being provided to control the flow of hydraulic fluid therethrough, and each of the lines 32 is fed from a common line 34 leading to a suitable conventional source of hydraulic fluid.

From the foregoing, it will now be seen that as fluid is forced in the hydraulic cylinders 31, the rods 30 are moved outwardly to move the arms 28 and 24 of the bell crank members in such manner as to lift the chains 21, which correspondingly lift the arm 11 and the I-beams 20, together with the mechanism associated with the I-beams, to be described more fully hereinafter.

It may be pointed out that the longitudinally extending members 11 previously described are adapted to be connected by transverse reinforcing rods or bars 35 and diagonal reinforcing members 36 (see Figure 1).

Each of the I-beams 20 has mounted thereon a plurality of clamps or clips 40 (see Figure 4), each of which comprises an arcuate lower section 41 adapted to surround the lower flange of the I-beam, and a transversely extending horizontal flange 42 adapted to overlie the upper portion of the vertical section of the I-beam. A set-screw 43 passed through a suitable aperture in the flange 42 serves to hold the clamp securely upon the I-beam. Each of the clamps 40 is provided with an extending portion 44 comprising a split collar, having an enlarged portion adapted to accommodate a shaft 45. The split portions of the collar 44 are adapted to be secured together and clamped about each of the shafts 45, as by means of screws 46. Each shaft 45 terminates, at its lower extremity, in a right-angularly disposed portion 47, which serves as an axle on which is positioned for rotation a harrow disk, generally indicated at 48. The disk 48 comprises a concavo-convex portion 49 and a hub section 50, within which latter are positioned roller bearings 51 surrounding the axle 47. Inner and outer end caps 52 and 53 are provided for a hub portion 50. The extending portion 47 of the shaft 45 terminates in a threaded portion 54 engaged by a nut 55 and provided with a washer 56 adapted to hold the disk securely on the axle.

From the foregoing, it will now be seen that the angular relation of the disks may be readily varied with respect to the I-beam, merely by loosening the screws 46 and re-tightening the same when the desired angularity is achieved. Correspondingly, the disks and their associated shafts and clamps may be readily positioned at any desired point along the I-beam, or may be removed therefrom altogether if desired.

Having particular reference to Figure 1, it will be seen that the disks in the forward frame, designated as 49', are so positioned and arranged as to open a furrow, that is, the four disks on each side of the frame 10 are so arranged that the outermost disks arranged on the forward side of the I-beam are positioned to incline inwardly and spread the dirt away from the furrow, while the two following disks positioned on the rear rail of the I-beam are correspondingly pointed to enlarge the furrow, and their inner extremities are positioned in substantially juxtaposed relation. Conversely, the disks on the rear section, designated as 49'', are positioned to close the furrow, the disks on the forward edge of the frame being positioned so that their trailing edges are inclined toward each other in relatively close spaced relation, while the disks on the rear edge are similarly positioned, but spaced outwardly from the forward disks to complete the closure of the furrow. Obviously, any desired multiple combination of disks in any desired arrangement, as, for example, the disks on the right side of the device positioned to open the furrow, and the disks on the left side positioned to close the furrow, may be arranged as necessary.

Obviously, other agricultural tools may be equally advantageously applied to the device, as, for example, cultivating teeth 60. The cultivating teeth 60 may be secured as by set screws 43' to clamps 42' similar in configuration to clamps 42. The clamps include split collars 44' adapted to engage shafts 45' carried by the cultivating teeth, the separable portions of the collars being secured in related assembly and clamped about the shafts as by means of bolts 46'. As shown in Figure 2, the teeth may be biased forwardly in a conventional manner, as by springs 61 surrounding bolts 62 and abutting, at one extremity, washers 63, the other extremity abutting the tooth 60.

A still further alternative attachment is disclosed in Figure 3 wherein the frame 10 is substantially identical to the frames previously discussed and includes an I-beam 20. Mounted on the I-beam 20 in any suitable manner, as by clamps, which may take a form similar to the previously described clamps 40, are hoppers 65 for seed having internally positioned seed feeding means, of any desired conventional type (not shown) contained therein, which means are adapted to be driven by a shaft 66 including sprockets 67 rotatable by chains 68 connected to any desired source of power, as, for example, the mechanism of the tractor. Access to the hoppers is provided, as by means of hinged cover members 69, and a seed feeding tube 70 leads downwardly to a point adjacent the ground. Follower rollers 71 are provided to cover the seeds, the rollers being mounted on supporting brackets 72.

From the foregoing, it will now be seen that there is herein provided an improved agricultural implement adapted for the accomplishment of a wide variety of agricultural functions, which adapt themselves to a large number of combinations and arrangements of parts and elements.

It will also be seen that there is herein provided a device which accomplishes all of the objects of this invention, and many others, including advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. An agricultural implement comprising a frame, means for connecting said frame to the power lift of a tractor, a transversely extending I-beam carried by said frame, a plurality of agricultural implement supporting clamps secured to the flanges of said I-beam, said clamps comprising horizontally disposed jaws engaging vertically disposed flanges on said I-beam and a laterally extending arm on said jaws comprising a split clamp having a vertical bore for receiving the shank of a tool.

2. A clamp for supporting an agricultural implement from the vertical flanges of a transverse I-beam comprising a body having a vertical face engageable with the vertical outer surface of an I-beam flange, a lower curved jaw partially embracing the lower edge of a vertical flange of an I-beam, a horizontal jaw overlying said lower jaw, means on said upper jaw for securing a vertical flange of an I-beam to said face and between said jaws, and a laterally extending tool carrying arm on said body opposite said jaws, said arm consisting of a split clamp having a vertical bore for receiving the shank of an agricultural implement.

DAVIS E. LEWIS.

REFERENCES CITED

The following references are of record in the file of this patent:

UNITED STATES PATENTS

| Number | Name | Date |
| --- | --- | --- |
| 508,280 | Cavallaro | Nov. 7, 1893 |
| 1,215,403 | Parker | Feb. 13, 1917 |
| 1,251,096 | Paul | Dec. 25, 1917 |
| 1,544,750 | Hawkins | July 7, 1925 |
| 1,876,872 | Douglas | Sept. 13, 1932 |
| 2,029,249 | Noel et al. | Jan. 28, 1936 |
| 2,174,808 | Tuft | Oct. 3, 1939 |
| 2,287,890 | Legassey | June 30, 1942 |
| 2,335,156 | McMahon | Nov. 23, 1943 |
| 2,352,491 | Orelind | June 27, 1944 |